United States Patent
Benesch

(10) Patent No.: US 8,292,558 B2
(45) Date of Patent: Oct. 23, 2012

(54) TRAILER FOR CONVENIENTLY LOADING AND TRANSPORTING A FOUR-WHEEL VEHICLE

(76) Inventor: Scott Benesch, Cumberland, WI (US)

( * ) Notice: Subject to any disclaimer, the term of this patent is extended or adjusted under 35 U.S.C. 154(b) by 192 days.

(21) Appl. No.: 12/717,795

(22) Filed: Mar. 4, 2010

(65) Prior Publication Data

US 2011/0217137 A1    Sep. 8, 2011

(51) Int. Cl.
*B62D 63/06* (2006.01)
(52) U.S. Cl. .................................................. 410/4
(58) Field of Classification Search ........... 410/4, 5, 410/6; 414/469, 480, 482, 485; 280/789
See application file for complete search history.

(56) References Cited

U.S. PATENT DOCUMENTS

| | | | | |
|---|---|---|---|---|
| 2,661,108 A | * | 12/1953 | Horn et al. | 414/485 |
| 2,803,362 A | * | 8/1957 | Saenz | 414/480 |
| 2,860,800 A | * | 11/1958 | Wilson et al. | 414/482 |
| 3,011,800 A | * | 12/1961 | Mitsuyasu | 280/482 |
| 3,403,924 A | | 10/1968 | Oliveira | |
| 3,781,030 A | | 12/1973 | Ekedal | |
| 3,786,950 A | | 1/1974 | Zemien | |
| 4,175,768 A | | 11/1979 | Thackray | |
| 4,362,316 A | | 12/1982 | Wright | |
| 4,490,089 A | * | 12/1984 | Welker | 414/483 |
| 4,504,075 A | | 3/1985 | Dawson | |
| D278,615 S | | 4/1985 | Law et al. | |
| 4,592,564 A | | 6/1986 | Warnock et al. | |
| 4,813,841 A | * | 3/1989 | Eischen | 414/477 |
| 4,958,980 A | | 9/1990 | Holmes et al. | |
| 4,995,129 A | | 2/1991 | Comardo | |
| 5,016,896 A | * | 5/1991 | Shafer | 280/400 |

(Continued)

FOREIGN PATENT DOCUMENTS

CA    2515878 AA    9/2006

(Continued)

OTHER PUBLICATIONS http://www.discount-trailers.com/frame_atv_trailer.htm Downloaded on Aug. 23, 2009 The #UATV1 frame style ATV trailer uses the basic frame along with two 6 foot long by 11 inch wide trailer channels and two 6 foot long by 11 inch wide trailer ramps. The 4 wheeler trailer channels are constructed from 1/2 inch plywood.

(Continued)

*Primary Examiner* — H Gutman
(74) *Attorney, Agent, or Firm* — Russ Weinzimmer; Russ Weinzimmer & Associates PC

(57) ABSTRACT

A trailer for conveniently loading and transporting a four wheel vehicle includes a bi-stable interactive ramp that is integral with the trailer. A support bar enables the ramp to pivot about the support bar's axis between two stable positions, one of the positions being in an inclined position when the vehicle is being loaded or unloaded, and the second of the positions being in a horizontal position after the vehicle is loaded. A rear-wheels support frame supports the rear wheels of the ATV when loaded. A ramp bar urges the front-end chassis of the ATV upward as the ATV's rear wheels are guided up the bi-stable ramp, and a front-end chassis support frame supports the front-end chassis of the ATV when loaded. The trailer includes a trailer hitch assembly that is attachable to a towing vehicle.

10 Claims, 7 Drawing Sheets

U.S. PATENT DOCUMENTS

| | | | | |
|---|---|---|---|---|
| 5,016,897 A | * | 5/1991 | Kauffman | 280/402 |
| 5,059,085 A | | 10/1991 | Koller | |
| 5,090,718 A | * | 2/1992 | Kauffman | 280/402 |
| 5,308,213 A | * | 5/1994 | Gilbertson | 414/482 |
| 5,354,090 A | | 10/1994 | Grovom | |
| 5,387,001 A | * | 2/1995 | Hull et al. | 280/402 |
| 5,394,583 A | | 3/1995 | Plate | |
| D360,729 S | | 7/1995 | Collins | |
| 5,513,868 A | | 5/1996 | Barr | |
| 5,727,920 A | * | 3/1998 | Hull et al. | 414/476 |
| 5,924,836 A | | 7/1999 | Kelly | |
| RE36,567 E | * | 2/2000 | Godbersen | 280/414.1 |
| 6,050,737 A | | 4/2000 | Russell | |
| 6,113,130 A | | 9/2000 | Saulce | |
| 6,139,247 A | | 10/2000 | Wright | |
| 6,537,014 B1 | | 3/2003 | Ridgdill | |
| 6,557,882 B2 | | 5/2003 | Harrington | |
| 6,981,835 B1 | | 1/2006 | Groth | |
| 7,083,184 B2 | | 8/2006 | Sawyer | |
| D548,170 S | | 8/2007 | Ezra | |
| D573,513 S | | 7/2008 | Koch | |
| 7,540,528 B2 | | 6/2009 | Spainhower | |
| 2005/0036869 A1 | | 2/2005 | Negranti | |
| 2009/0123259 A1 | | 5/2009 | Barclay | |

FOREIGN PATENT DOCUMENTS

| | | |
|---|---|---|
| CA | 2526545 AA | 5/2007 |
| WO | 2005014333 A3 | 2/2005 |

OTHER PUBLICATIONS http://www.discount-trailers.com/custom-motorcycle-trailer.htm Downloaded on Aug. 23, 2009 Kendon Chopper trailer and custom motorcycle trailer is the ultimate transport solution for loading bikes with wheelbases of 900 or less. The custom motorcycle trailer features a solid steel tube frame that can support a bike up.

http://cgi.ebay.com/ebaymotors/New-1075-lb-Motorcycle-Atv-Quad-Utility-TRAILER-SALE__W0QQitemZ320414192604QQcmdZViewItemQQptZLH__DefaultDomain__100?hash=item4a9a2c93dc&_trksid=p4506.c0.m245 Downloaded on Aug. 23, 2009.

http://www.discount-trailers.com/kendon-dual-trailers.htm Downloaded on Aug. 23, 2009 The Kendon Stand-Up Folding Dual Trailer is an exciting new product. This folding trailer has the ability to accommodate 2 motorcycles or 2 atv's at once! The motorcycle trailer also folds up and stands up. This means that.

http://www.discount-trailers.com/folding-motorcycle-trailer.htm Downloaded on Aug. 23, 2009 The motorcycle trailer that goes anywhere . . . and stows anywhere! The Stinger motorcycle trailer is a new breed of folding motorcycle trailers. The versatile trailer solves many of the.

http://www.discount-trailers.com/stoaway_trailer.htm Downloaded on Aug. 23, 2009 The Stoway is an innovative approach to the lightweight, compact motorcycle trailer. When this trailer is not in use, simply un-pin the tongue, wheel chock and a-frame bars, un-pin the main rail bed, and fold it up. The pieces nestle.

http://www.discount-trailers.com/port-a-chopper.htm Downloaded on Aug. 23, 2009 The Port-a-Chopper Motorcycle Transport Trailer is designed to be taken and used almost anywhere • Disassembles and stores in the trunk or back of your vehicle.

http://www.discount-trailers.com/trike-trailer.htm Downloaded on Aug. 23, 2009 The Stinger trike trailer is a folding trailer that makes hauling and transporting your trike an easy task. The trike trailer is strong and sturdy and is designed to fold up when not in use. The folded dimensions of the folding trike trailer are.

* cited by examiner

TRAILER FOR CONVENIENTLY LOADING AND TRANSPORTING A FOUR-WHEEL VEHICLE

FIELD OF THE INVENTION

The present invention generally relates to equipment for transporting vehicles, and particularly to trailers for transporting vehicles.

BACKGROUND OF THE INVENTION

A user of a recreational all-terrain vehicle (ATV) (or other four-wheel vehicle) often needs to transport their ATV to a remote location. Often, such a user will transport the ATV on a trailer or in the bed of a pickup truck. However, loading an ATV onto a trailer or into the bed of a truck can be difficult and cumbersome, requiring considerable manpower and/or an extra loading ramp. It can be equally difficult to unload an ATV from a trailer or pickup truck. A truck bed generally will require an extra ramp for loading the ATV into the bed.

Another drawback of known trailers is that they are large and difficult to operate, also requiring considerable storage space when not in use. Attempts have been made to provide collapsible trailers that occupy less space when not in use. However, the collapsible trailers known in the art can be difficult to operate, often requiring the assistance of multiple people to place the trailer in an unfolded position. Other collapsible trailers can be difficult to move or position as desired, once the trailers are in an unfolded configuration.

SUMMARY OF THE INVENTION

The invention provides a trailer for conveniently loading and transporting a four wheel vehicle, such as an ATV. An ATV or other four-wheel vehicle can be loaded onto the trailer by being driven onto the trailer without requiring an additional ramp. Furthermore, the trailer is compact and uses less material than standard utility trailers, thereby reducing production cost, storage space, and gross weight. The trailer includes a bi-stable interactive ramp, a support bar enabling the ramp to tilt about the support bar's axis, a rear-wheels support frame for supporting the rear wheels of the ATV when loaded, a trailer wheel assembly, a ramp bar for urging the front-end chassis of the ATV upward as the ATV's rear wheels are guided up the ramp, a front-end chassis support frame for supporting the front-end chassis of the ATV when loaded, and a trailer hitch assembly attachable to a towing vehicle.

In one embodiment, a trailer for conveniently loading and transporting a four wheel vehicle is claimed, the trailer comprising: a bi-stable interactive ramp, the ramp in a first state being capable of guiding a pair of wheels of the vehicle upward as the vehicle is driven forward, and the ramp in a second state being capable of guiding the pair of wheels substantially horizontally as the vehicle is driven forward; a support bar, the support bar being perpendicular to and supporting the ramp, so as to enable the ramp to tilt about the axis of the support bar between the first and second states; a rear-wheels support frame, the rear-wheels support frame being attached to and supporting the support bar and the ramp, the rear-wheels support frame being capable of supporting rear wheels of the vehicle when the vehicle has been fully loaded onto the trailer; a trailer wheel assembly attached to and supporting the rear-wheels support frame; a ramp bar, the ramp bar extending longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp; a front-end chassis support frame, the front-end chassis support frame being attached to and extending substantially horizontally forward from a front end of the ramp bar, the front-end chassis support frame being capable of supporting and stabilizing a front-end chassis of the vehicle while the rear wheels of the vehicle are resting upon the rear-wheel support frame; and a trailer hitch assembly attached to and supporting the front-chassis support frame, the trailer hitch assembly being attachable to a tow vehicle.

In some embodiments, the trailer hitch assembly comprises a telescoping tongue assembly. In other embodiments, an upper portion of the ramp bar is curved. In other embodiments, the bi-stable interactive ramp enters an indeterminate state from which it may default to the horizontal position of the second state when in an unloaded state. In other embodiments, the bi-stable interactive ramp repositions into the first state when the vehicle contacts with the bi-stable interactive ramp. In other embodiments, the ramp bar comprises a low friction surface.

In some embodiments, the front-end chassis support frame comprises a plurality of outer support rails coupled to a center rail, the outer support rails operable to center the vehicle over the center rail. In other embodiments, the trailer further comprises a receiver mounted to the rear-wheels support frame. In some of these embodiments, the receiver is operable to support additional cargo or tandem trailer connections.

In another embodiment, a trailer for conveniently loading and transporting a four wheel vehicle is claimed, the trailer comprising: a bi-stable interactive ramp, the ramp in a first state being capable of guiding a pair of wheels of the vehicle upward as the vehicle is driven forward, and the ramp in a second state being capable of guiding the pair of wheels substantially horizontally as the vehicle is driven forward, the bi-stable interactive ramp entering an indeterminate state from which it may default to the horizontal position of the second state when in an unloaded state; a support bar, the support bar being perpendicular to and supporting the ramp, so as to enable the ramp to tilt about the axis of the support bar between the first and second states; a rear-wheels support frame, the rear-wheels support frame being attached to and supporting the support bar and the ramp, the rear-wheels support frame being capable of supporting rear wheels of the vehicle when the vehicle has been fully loaded onto the trailer; a trailer wheel assembly attached to and supporting the rear-wheels support frame; a ramp bar, the ramp bar comprises a low friction surface, wherein an upper portion of the ramp bar is curved, the ramp bar extending longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp; a front-end chassis support frame, the front-end chassis support frame being attached to and extending substantially horizontally forward from a front end of the ramp bar, the front-end chassis support frame capable of supporting, centering and stabilizing a front-end chassis of the vehicle while the rear wheels of the vehicle are resting upon the rear-wheel support frame; a trailer hitch assembly attached to and supporting the front-chassis support frame, the trailer hitch assembly being attachable to a tow vehicle and being telescopable; and a receiver mounted to the rear-wheels support frame, the receiver operable to support additional cargo or tandem trailer connections.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION

Preferred embodiments of the present invention are illustrated in the FIGs., like numerals being used to refer to like and corresponding parts of the various drawings.

According to one embodiment of the present disclosure, a collapsible utility trailer having a "T" shaped body is disclosed. This construction uses far less material than a standard utility type trailer which in turn reduces production cost and gross weight. Furthermore, the trailer of the present disclosure provides for conveniently loading and transporting a four wheel vehicle. The trailer includes a bi-stable interactive ramp, a support bar, a rear-wheels support frame, a trailer wheel assembly, a ramp bar, a front-end chassis support frame and a trailer hitch assembly. The bi-stable interactive ramp being in either a first state capable of guiding a pair of wheels of the vehicle upward as the vehicle is driven forward or a second state being capable of guiding the pair of wheels substantially horizontally as the vehicle is driven forward. The support bar is perpendicular to and supports the bi-stable interactive ramp, so as to enable the bi-stable interactive ramp to rotate about the major axis of the support bar between the first and second states. The rear-wheels support frame couples to and supports the support bar and the bi-stable interactive ramp. The rear-wheels support frame capable of supporting rear wheels of the vehicle when the vehicle has been fully loaded onto the trailer. The trailer wheel assemblies attach to and support the rear-wheels support frame. The ramp bar extends longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp. The front-end chassis support frame attached to and extending substantially horizontally forward from a front end of the ramp bar. The front-end chassis support frame capable of supporting, centering and stabilizing a front-end chassis of the vehicle while the rear wheels of the vehicle are resting upon the rear-wheel support frame. The trailer hitch assembly attaches to and supports the front-chassis support frame, the trailer hitch assembly being attachable to a tow vehicle.

Embodiments of the present disclosure provide a trailer operable to transport or carry various vehicles. One particular embodiment depicts the trailer carrying an All Terrain Vehicle (ATV). However, embodiments of the present disclosure should not be limited to carrying ATV's. Rather, embodiments of the present disclosure may be used to carry any compatible vehicle known to those having skill in the art.

Figure 1A:
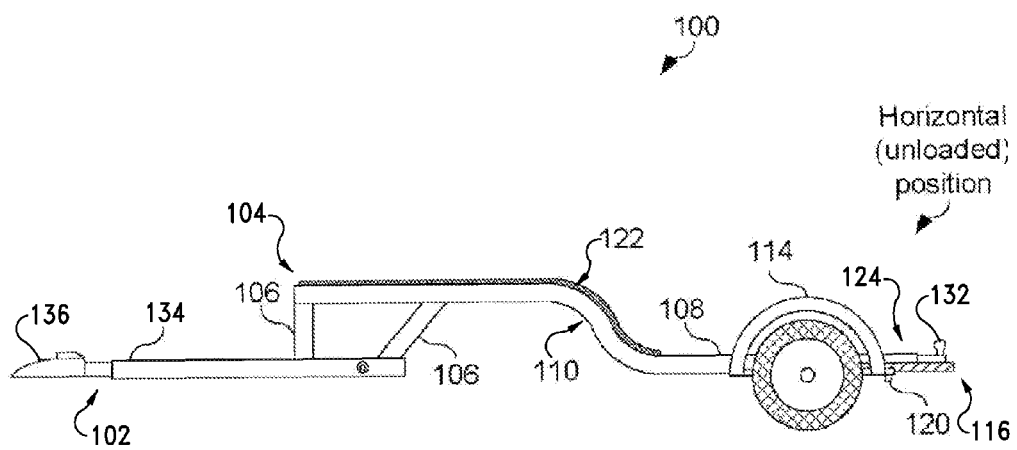
FIGS. 1A and 1B provide a side and top-down view of a trailer in accordance with embodiments of the present disclosure.
Figure 1B:
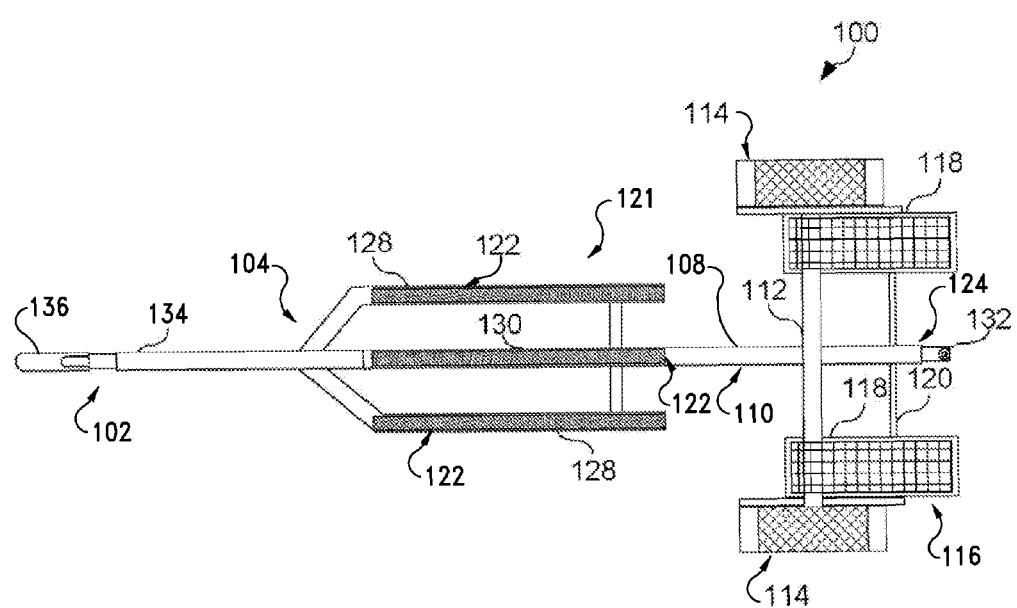

FIGS. 1A and 1B provide a side and top-down view of a trailer in accordance with embodiments of the present disclosure. Trailer 100 includes a trailer hitch assembly 102, front-end chassis support frame 104, vertical support members 106, ramp bar 108, an angled portion 110 of ramp bar 108, rear-wheels support frame 112, trailer wheel assemblies 114, and a bi-stable interactive ramp 118. The trailer hitch assembly 102 has a longitudinal axis and allows the trailer to detachably couple to a tow vehicle via tongue assembly 126. The front-end chassis support frame 104 supports and stabilizes a vehicle loaded on the trailer. The front-end chassis support frame 104 can help ensure that alignment of the vehicle is forward-facing, and can also help ensure the vehicle is laterally centered so as to provide a balanced weight distribution. The front-end chassis support frame 104 can also help ensure that there is minimal to no pitch, yaw, and roll of the vehicle being loaded on the trailer. The front-end chassis support frame 104 couples to a sleeve 134 through vertical support member 106, the sleeve 134 containing the trailer hitch assembly 102. This allows the front-end chassis support frame 104 to be vertically displaced above the longitudinal axis of the tongue assembly 136. Front-end chassis support frame 104 includes a rail assembly 121 that supports the front end chassis of the vehicle to be loaded. Additionally a sliding surface 122 may be located on the rail members 128 and 130 of the rail assembly 121, and may extend over the angled portion 110 of the ramp bar 108 in order to receive and interface with a vehicle. The sliding surface 122 prevents damage to the trailer 100 or vehicle as the vehicle loads onto the trailer 100 and is supported by the rail assembly 121. Rear-wheels support frame 112 couples to the ramp bar 108 and is oriented laterally with respect to the ramp bar 108. Trailer wheel assemblies 114 are mounted on each end of the rear-wheels support frame 112.

The bi-stable interactive ramp 116 includes a pair of ramps 118 that hingedly mount to supporting bar 120. The supporting bar 120 may be physically coupled to the ramp bar 108 and/or the trailer wheel assemblies 114. When the ramps 118 are unloaded, the bi-stable interactive ramp 116 is in an indeterminate state and therefore can be in a horizontal or neutral position as shown in FIGS. 1A and 1B, or in any position between its two stable positions because there is no loading by which to force the ramps 118 of the bistable interactive ramp 116 to be in either one of its two stable states.

Figure 2:
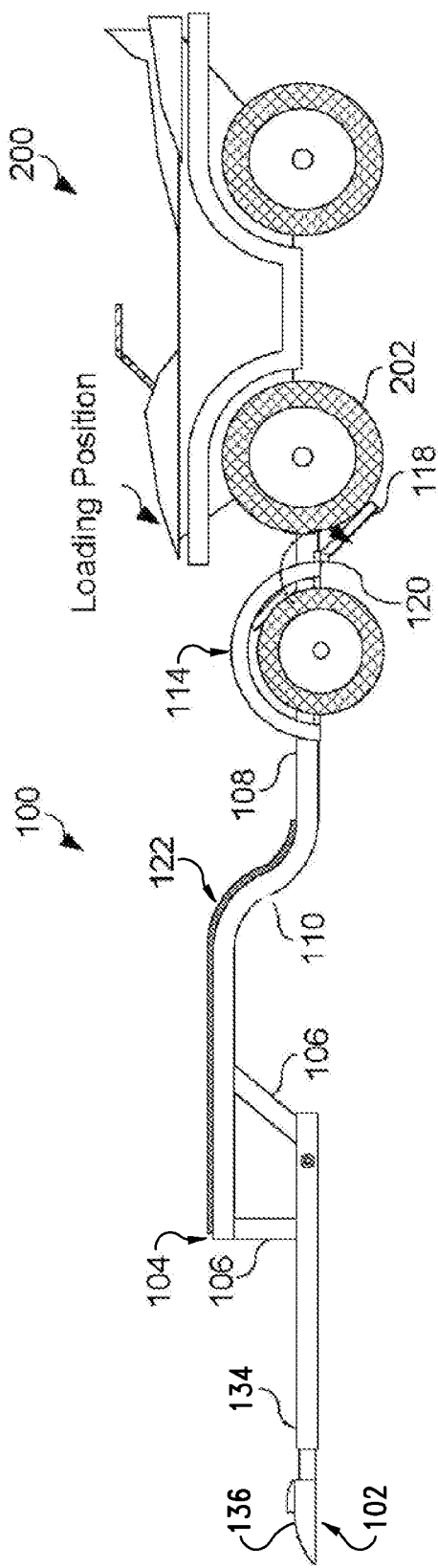
FIG. 2 depicts a utility vehicle being loaded onto trailer 100 in accordance with embodiments of the present disclosure.

FIG. 2 depicts a utility vehicle 200 being loaded onto trailer 100 in accordance with embodiments of the present invention. As front wheels 202 contact ramps 118 of the trailer, ramps 118 rotate downward due to the rotation of the front wheels into a loading position (first state) in order to receive and facilitate loading of the vehicle. As the vehicle moves forward with respect to trailer 100, ramps 118 will return to a horizontal (loaded) position (second state) wherein ramp assembly 116 is supporting the forward part of vehicle 200. Ramps 118 rotate about support bar 120 to which the ramps 118 are hingedly attached. Mechanical stops (not shown) will prevent the ramp from rotating past the horizontal (loaded) position when front wheels of the vehicle have traveled past the support bar 120.

Figure 3:
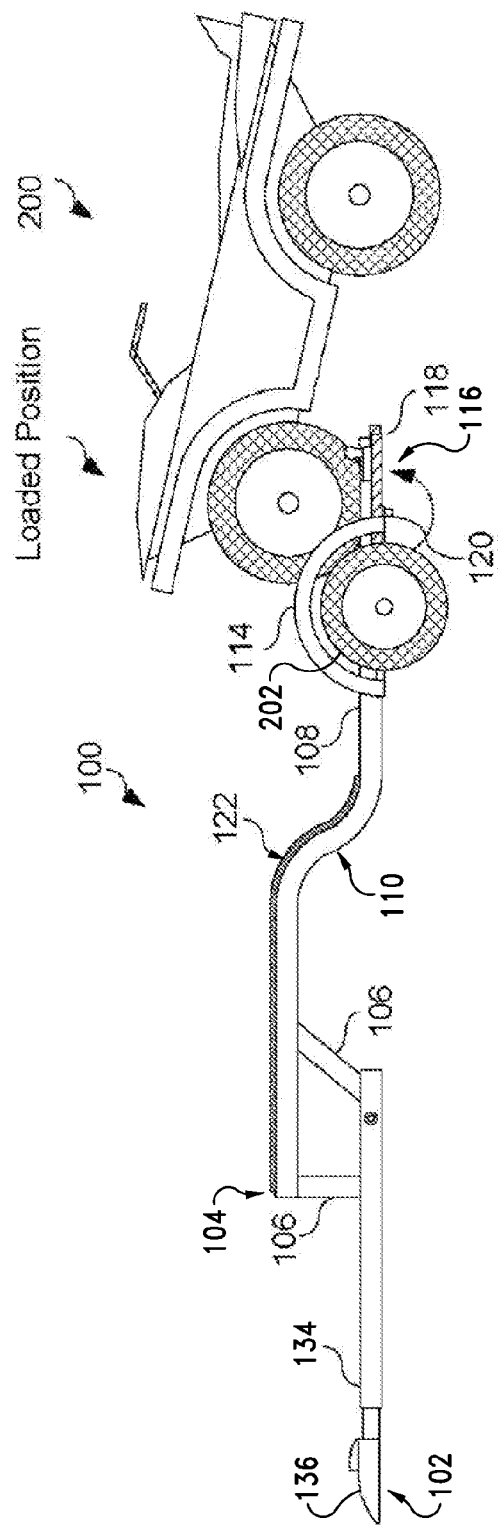
FIG. 3 depicts the vehicle continuing to move forward wherein the front wheels of the vehicle have caused ramps to rotate into the loaded position in accordance with embodiments of the present disclosure.

FIG. 3 depicts the vehicle 200 continuing to move forward wherein the front wheels 202 of the vehicle have traveled past support bar 120 and have thereby caused ramps 118 to rotate into the horizontal loaded position in accordance with embodiments of the present invention.

Figure 4:
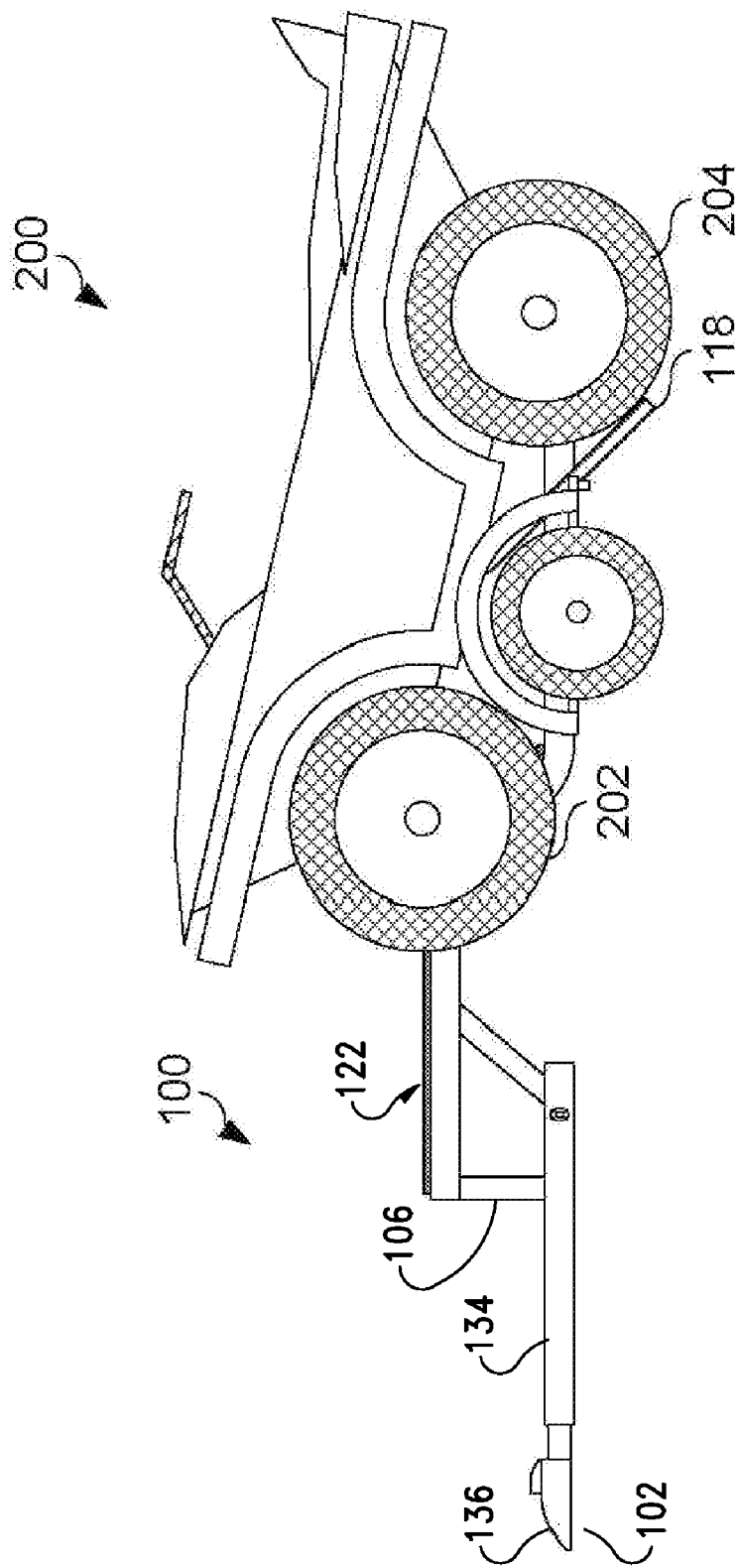
FIG. 4 depicts vehicle continuing to move forward wherein the frontal frame of the vehicle engages the sliding surface of the trailer in accordance with embodiments of the present disclosure.

FIG. 4 depicts vehicle 200 continuing to move forward wherein the frontal frame of the vehicle 200 engages the sliding surface 122 of the trailer 100 in accordance with embodiments of the present invention. As vehicle 200 continues to move forward, front wheels 202 have moved passed the ramps 118. In order to continue to be supported, the front-end chassis support frame 104 will contact the frame of the vehicle 200. Outer rails 128 of rail assembly 121 help ensure that the vehicle is centered with respect to center rail 130.

The sliding surface of the horizontal support area created by rail assembly 121 is designed to be a platform supporting the frontal frame of the loaded vehicle 200. The outer supporting rails 128 connect to the center rail 130 of rail assembly 121 and may in one example support the lower control arms of the frame of the vehicle 200. These rails 208 are triangular in shape at the distal end of the rail assembly 121 and angle in an outward direction. This forces the vehicle 200 toward the center of trailer 100 and eliminates side to side movement. This causes approximately half of the vehicle weight to be supported by this rail system 121. The remaining half of the weight is supported over the axle which is also referred to as rear-wheels support frame 112. With the front portion of the vehicle 200 supported by the rails 128, 130 of rail assembly 121, the user may perform several maintenance activities that are not possible or at least difficult to perform with a typical utility trailer. Clear accesses to vital areas of the loaded vehicle will facilitate repairs, cleaning, part replacement and adjustments with ease.

Figure 5:
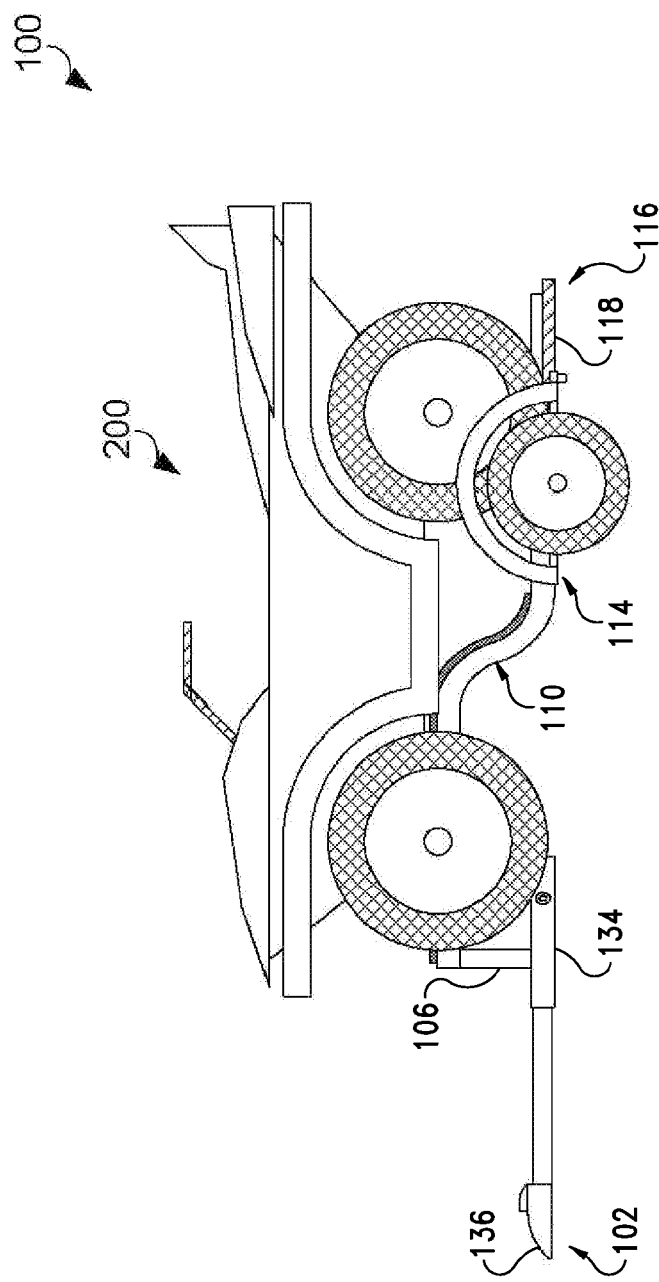
FIG. 5 depicts the vehicle in a fully loaded position with respect to trailer in accordance with embodiments of the present disclosure.

As rear wheels 204 of vehicle 200 contact ramps 118, the rotation the rear wheels 204 force ramps 118 to reposition by rotating them about support bar 120 into the loading position. Vehicle 200 will continue to move forward and as it travels forward with respect to ramps 118 and past the pivot point created by support bar 120, the rear wheels 204 will force the ramps 118 to return to and remain in a loaded horizontal position as shown in FIG. 5. FIG. 5 depicts the vehicle in a fully loaded position with respect to trailer 100 in accordance with embodiments of the present invention. In the fully loaded position, the forward portion of the vehicle is supported by front-end chassis support frame 104 which is directly supporting the frame of vehicle 200 while the aft portion of vehicle 200 is supported by the bi-stable interactive ramp assembly 116 through rear wheels 204.

Figure 6:
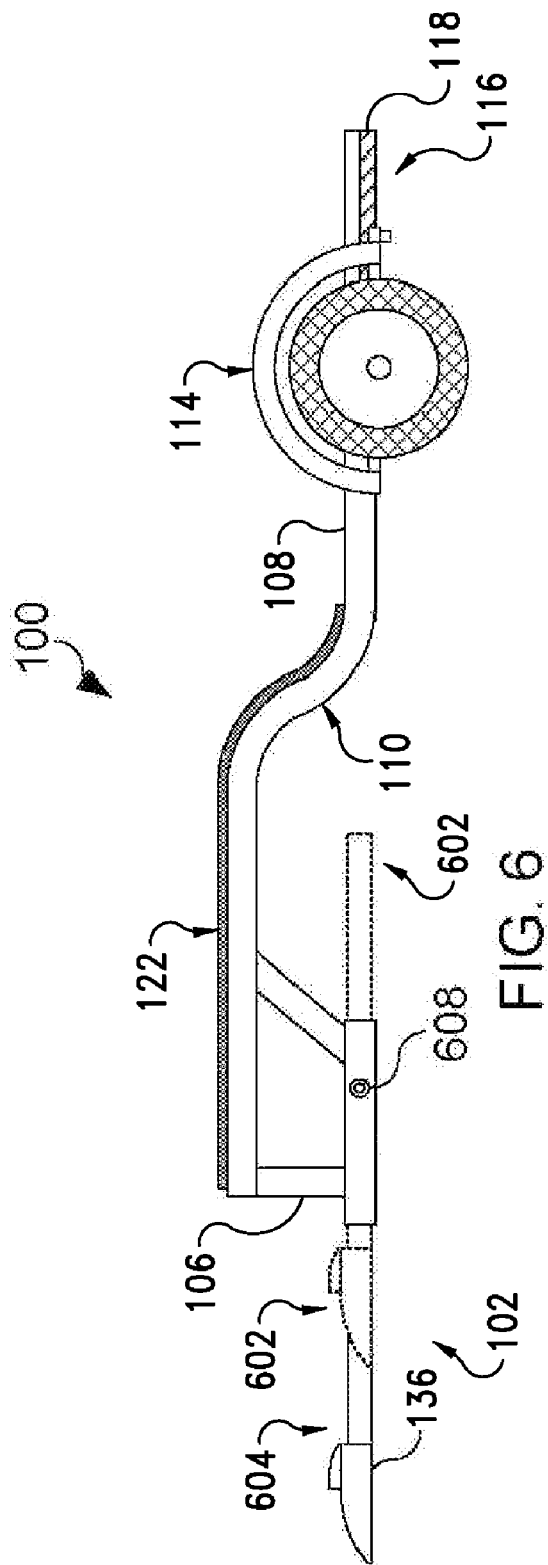
FIG. 6 provides a drawing depicting the telescoping or collapsible feature associated with the Tongue Assembly of a trailer in accordance with embodiments of the present disclosure.

FIG. 6 provides a drawing depicting the telescoping or collapsible feature associated with the trailer hitch assembly 102 of a trailer 100 in accordance with embodiments of the present invention. As shown here the trailer hitch assembly 102 may slide within sleeve 134 between a retracted Position 602 (illustrated by dotted lines) and an extended Position 604 (illustrated by solid lines). This allows the overall length of the trailer 100 to be reduced such that the trailer 100 may be stored in a vertical position along a standard 8-foot high wall. Bolt 608 may be used to lock the tongue assembly 136 within sleeve 134. This greatly enhances the storage abilities associated with the trailer.

Figure 7:
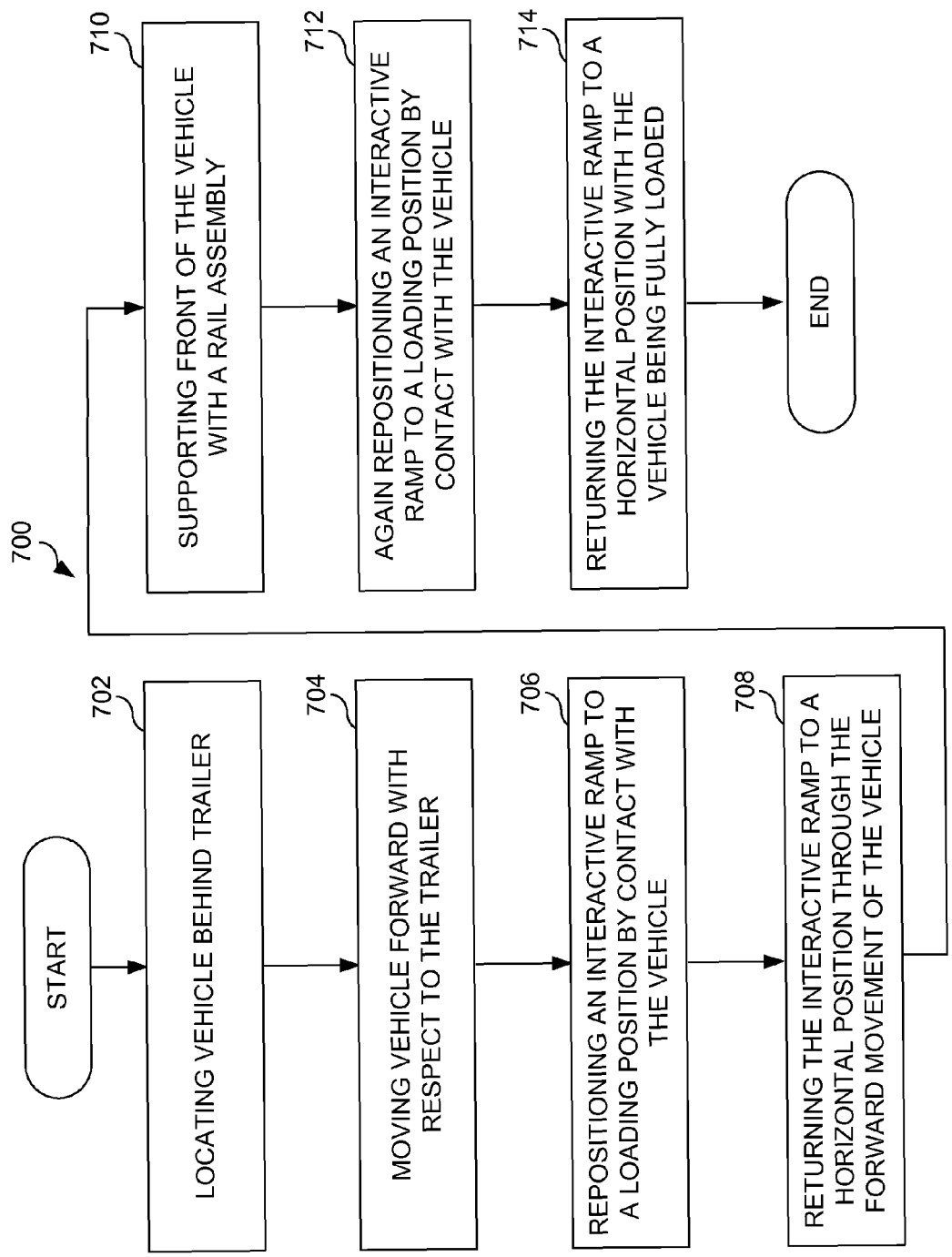
FIG. 7 provides a logic flow diagram associated with the process of loading a vehicle onto a trailer in accordance with embodiments of the present disclosure.

FIG. 7 provides a logic flow diagram associated with the process of loading a vehicle onto a trailer 100 in accordance with embodiments of the present disclosure. Operations 700 begin with Block 702 where a vehicle to be loaded onto the trailer as illustrated with respect to FIGS. 1 through 6 is positioned behind the trailer. In Block 704, the vehicle begins to move forward with respect to the trailer. In Block 706, when the rotating forward set of wheels on the vehicle contact the bi-stable interactive ramp of the trailer, the bi-stable interactive ramp is forced to reposition into a loading position. The ramp assembly falls to loading position as the rotating wheels of the vehicle make initial contact with ramps 118 and the bi-stable interactive ramp system 116 hingedly rotates about supporting bar 120. When unloaded in any way, the bi-stable interactive ramp system 116 is in an indeterminate state and is therefore free to rotate between its two stable positions until loaded.

As the vehicle continues to move forward and the forward set of wheels move completely past the bi-stable interactive ramp, the bi-stable interactive ramp is once again unloaded and therefore in an indeterminate state and thus is free to return to (or remain in) a horizontal position as in Block 708. At this time, the frontal frame of the vehicle may contact a the assembly 121. The rail assembly 121 partially supports the vehicle through the interface between the rail assembly 121 and the frontal frame in Block 710. To facilitate this, a sliding surface 122 may be provided on the contact surface between the rail assembly and the frontal frame. As the vehicle moves forward over axle shaft the underside, skid plate, frame and lower control arms begin to line up for descent onto rail system 121. The sliding surface may be an attached layer or coating of plastic, Teflon or other various materials to reduce friction. As the front of vehicle moves past ramp system 116 and onto the rails 128, 130 of rail assembly 121, the ramp 116 is free to return to the loading position and accommodate rear of vehicle when contacted by the rotating rear wheels.

The vehicle at this time may still not be fully loaded. As such, the vehicle may continue to move forward with respect to the trailer. As the rear set of wheels contact the bi-stable interactive ramp 116 in Block 712, the bi-stable interactive ramp is once again forced to rotate into the loading position. This allows the vehicle to continue to move forward and become fully loaded onto the trailer. As the rear set of wheels, and the vehicle as a whole, move up and forward, the bi-stable interactive ramp again will be forced to return to the horizontal position in Block 714. At this time, as the rear set of wheels move past the center of rotation (i.e. past the pivot point created by support bar 120 of the bi-stable interactive ramp 116, gravity and the weight of the vehicle forces the bi-stable interactive ramp to remain in the horizontal loaded position and the vehicle is then supported in part by the rail assembly 121 and in part by the bi-stable interactive ramp 116. The rail assembly 121 supports the vehicle through the front frame 104 and the bi-stable interactive ramp 116 supports the vehicle through the rear set of wheels and rear wheels support frame 112. The rail assembly 121 may have outer members 128 that prevent side-to-side motion or lateral motion of the vehicle relative to the trailer 100. The tongue assembly 136 of the trailer hitch assembly 102 allows the trailer 100 to detachably couple to a tow vehicle. Further, a receiver 124 including a towball 132 located at the distal end of the trailer 100 may be used to detachably couple the trailer 100 to a second object (not shown) such as a receiver accessory or a tandem trailer.

The "T" shape of the trailer as disclosed allows construction of the utility trailer using far less material than a standard utility type trailer. This in turn reduces production cost and gross weight. Further, the trailer is collapsible. By simply removing a single pin or bolt in the tongue assembly. The tongue assembly may be sleeved to reduce the overall length of the trailer. In one embodiment, this may reduce the trailer's length by 2 or more feet. By reducing length the user may store the unit in a vertical or horizontal position in a confined space. Another advantage over a standard utility type trailer is that the standard trailer is typically a square or rectangular shape. Maneuverability is reduced by the 4 right angles. Because embodiments of the present invention form a "T" shape instead, this allows for greater mobility in a reduced space. The "T" shape also reduces danger areas. (i.e. 2 less corners to possibly cause injury to the user.)

Most if not all standard trailer designs require a ramp loading method. Embodiments of the present invention use a bi-stable interactive ramp that reacts to rotational force and gravity. When the rotating wheels of a vehicle to be loaded make contact with the bi-stable, the rotational force of the wheels forces the ramp into a down (or loading) position. By counter balance the ramp will return to the horizontal position as vehicle moves forward and the wheels move past the support bar 120. The ramps react to accommodate movement in either direction for loading and unloading. When loading is completed the ramps are held in the horizontal position by the weight of the vehicle against the mechanical stops (not shown). The ramp system is actually a platform for supporting a loaded vehicle as well as an elevation device. As an integral part of the supporting platform, the ramps are permanently secured and this therefore this eliminates the need for pins, slots or stowage of typical ramps. Because many ramp designs require cables, pins and the like to secure them, any mechanical failure of those devices or a failure to engage them can cause the ramps to depart from the trailer during use. This may cause harm to other motorists by creating obstacles in the roadway.

Embodiments of the present invention provide for a simple 4 step method of loading and unloading. These steps include: 1) Drive on; 2) Tie down; 3) Untie; and 4) Drive off. This process greatly simplifies the prior process of loading and unloading a trailer that typically requires many more steps. For example, one existing method of loading and unloading involves 11 steps. These steps include: 1) Remove ramp; 2) Install ramp; 3) Drive on; 4) Tie down; 5) Stow or secure ramp; 6) Remove ramp; 7) Install ramp; 8) Untie; 9) Drive off; 10) Remove ramp; and 11) Stow or secure ramp.

Embodiments of the present invention also provide an option not available on other trailers. A receiver, such as a 2" receiver style hitch 124 may be located to the rear of the trailer 100. This allows Embodiments of the present invention to accommodate the towing of another trailer or two (multiple) vehicle trailers in tandem. Also, there are many products (accessories) available utilizing the receiver style hitch. These products typically include but are not limited to cargo racks and other uses.

Embodiments of the present invention advantageously address the following problems. The construction involves less material and hence results in the trailer weighing less than a typical utility trailer. The telescoping tongue assembly allows the trailer to collapse in order to facilitate storage in a confined space. The trailer has no ramps to stow and offers a receiver hitch to accommodate additional cargo and tandem applications. The trailer may be used with or without a tow vehicle to support the frame of the load vehicle to assist in maintenance, repair and cleaning practice. Overall, this trailer provides increased mobility at a reduced cost. The "T" shape reduces dangerous areas, minimizes surface area (thus, limiting the collection of mud, snow and other debris), and eliminates encumbering side panels commonly found on utility trailers.

In summary, a collapsible utility trailer having a "T" shaped body is disclosed. This construction uses far less material than a standard utility type trailer which in turn reduces production cost and gross weight. The trailer includes a bi-stable interactive ramp, a support bar, a rear-wheels support frame, a trailer wheel assembly, a ramp bar, a front-end chassis support frame and a trailer hitch assembly. The bi-stable interactive ramp being in either a first state capable of guiding a pair of wheels of the vehicle upward as the vehicle is driven forward or a second state being capable of guiding the pair of wheels substantially horizontally as the vehicle is driven forward. The support bar is perpendicular to and supports the bi-stable interactive ramp, so as to enable the bi-stable interactive ramp to rotate about the major axis of the support bar between the first and second states. The rear-wheels support frame couples to and supports the support bar and the bi-stable interactive ramp. The rear-wheels support frame capable of supporting rear wheels of the vehicle when the vehicle has been fully loaded onto the trailer. The trailer wheel assemblies attach to and support the rear-wheels support frame. The ramp bar extends longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp. The front-end chassis support frame attached to and extending substantially horizontally forward from a front end of the ramp bar. The front-end chassis support frame capable of supporting, centering and stabilizing a front-end chassis of the vehicle while the rear wheels of the vehicle are resting upon the rear-wheel support frame. The trailer hitch assembly attaches to and supports the front-chassis support frame, the trailer hitch assembly being attachable to a tow vehicle.

In addition to any previously indicated modification, numerous other variations and alternative arrangements may be devised by those skilled in the art without departing from the spirit and scope of this description, and the appended claims are intended to cover such modifications and arrangements.

What is claimed is:

1. A trailer for conveniently loading and transporting a four wheel vehicle, the trailer comprising:
   a bi-stable interactive ramp, the ramp in a first state being capable of guiding a pair of wheels of the vehicle upward as the vehicle is driven forward, and the ramp in a second state being capable of guiding the pair of wheels substantially horizontally as the vehicle is driven forward;
   a support bar, the support bar being perpendicular to and supporting the ramp, so as to enable the ramp to tilt about the axis of the support bar between the first and second states;
   a rear-wheels support frame, the rear-wheels support frame being attached to and supporting the support bar and the ramp, the rear-wheels support frame being capable of supporting rear wheels of the vehicle when the vehicle has been fully loaded onto the trailer;
   a trailer wheel assembly attached to and supporting the rear-wheels support frame;
   a ramp bar, the ramp bar extending longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp;

a front-end chassis support frame, the front-end chassis support frame being attached to and extending substantially horizontally forward from a front end of the ramp bar, the front-end chassis support frame being capable of supporting and stabilizing a front-end chassis of the vehicle while the rear wheels of the vehicle are resting upon the rear-wheel support frame; and a trailer hitch assembly attached to and supporting the front-chassis support frame, the trailer hitch assembly being attachable to a tow vehicle.

2. The trailer of claim 1, wherein the trailer hitch assembly comprises a telescoping tongue assembly.

3. The trailer of claim 1, wherein an upper portion of the ramp bar is curved.

4. The trailer of claim 3, wherein the bi-stable interactive ramp defaults to the second state when in an unloaded state.

5. The trailer of claim 3, wherein the bi-stable interactive ramp repositions into the first state when the vehicle contacts with the bi-stable interactive ramp.

6. The trailer of claim 1, wherein the ramp bar comprises a low friction surface.

7. The trailer of claim 1, wherein the front-end chassis support frame comprises a plurality of outer support rails coupled to a center rail, the outer support rails operable to center the vehicle over the center rail.

8. The trailer of claim 1, further comprising a receiver mounted to the rear-wheels support frame.

9. The trailer of claim 7, the receiver operable to support additional cargo or tandem trailer connections.

10. A trailer for conveniently loading and transporting a four wheel vehicle, the trailer comprising:

a bi-stable interactive ramp, the ramp in a first state being capable of guiding a pair of wheels of the vehicle upward as the vehicle is driven forward, and the ramp in a second state being capable of guiding the pair of wheels substantially horizontally as the vehicle is driven forward, the bi-stable interactive ramp defaults to the second state when in an unloaded state;

a support bar, the support bar being perpendicular to and supporting the ramp, so as to enable the ramp to tilt about the axis of the support bar between the first and second states;

a rear-wheels support frame, the rear-wheels support frame being attached to and supporting the support bar and the ramp, the rear-wheels support frame being capable of supporting rear wheels of the vehicle when the vehicle has been fully loaded onto the trailer;

a trailer wheel assembly attached to and supporting the rear-wheels support frame;

a ramp bar, the ramp bar comprises a low friction surface, wherein an upper portion of the ramp bar is curved, the ramp bar extending longitudinally forward and upward from the rear-wheels support frame, the ramp bar being capable of supporting a front-end chassis of the vehicle, so as to enable the front-end chassis of the vehicle to be urged upward as the vehicle is driven forward, and at the same time that the rear wheels of the vehicle are being guided upward on the ramp;

a front-end chassis support frame, the front-end chassis support frame being attached to and extending substantially horizontally forward from a front end of the ramp bar, the front-end chassis support frame capable of supporting, centering and stabilizing a front-end chassis of the vehicle while the rear wheels of the vehicle are resting upon the rear-wheel support frame;

a trailer hitch assembly attached to and supporting the front-chassis support frame, the trailer hitch assembly being attachable to a tow vehicle and being telescopable; and a receiver mounted to the rear-wheels support frame, the receiver operable to support additional cargo or tandem trailer connections.

\* \* \* \* \*